(12) United States Patent
Salsbury et al.

(10) Patent No.: US 11,408,631 B2
(45) Date of Patent: *Aug. 9, 2022

(54) EXTREMUM-SEEKING CONTROL SYSTEM WITH SATURATION CONSTRAINTS

(71) Applicant: Johnson Controls Tyco IP Holdings LLP, Milwaukee, WI (US)

(72) Inventors: Timothy I. Salsbury, Mequon, WI (US); Carlos Felipe Alcala Perez, Milwaukee, WI (US); John M. House, St-Leonard (CA)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/739,986

(22) Filed: Jan. 10, 2020

(65) Prior Publication Data

US 2021/0215378 A1    Jul. 15, 2021

(51) Int. Cl.
*F24F 11/77* (2018.01)
*G05B 13/02* (2006.01)
*F24F 110/40* (2018.01)

(52) U.S. Cl.
CPC .......... *F24F 11/77* (2018.01); *G05B 13/0225* (2013.01); *F24F 2110/40* (2018.01)

(58) Field of Classification Search
CPC ............................. F24F 11/77; F24F 2110/40
USPC ........................................................ 700/276
See application file for complete search history.

(56) References Cited

U.S. PATENT DOCUMENTS

| | | | |
|---|---|---|---|
| 6,265,843 B1 | 7/2001 | West et al. | |
| 7,827,813 B2 | 11/2010 | Seem | |
| 8,027,742 B2 | 9/2011 | Seem et al. | |
| 8,200,344 B2 | 6/2012 | Li et al. | |
| 8,200,345 B2 | 6/2012 | Li et al. | |
| 8,473,080 B2 | 6/2013 | Seem et al. | |
| 8,495,888 B2 | 7/2013 | Seem | |
| 8,571,689 B2 * | 10/2013 | Macharia | C12M 41/48 700/28 |

(Continued)

OTHER PUBLICATIONS

Walsh, "On the Application of Multi-Parameter Extremum Seeking Control", Proceeding of the American Control Conference, Jun. 2000, pp. 411-415.*

(Continued)

*Primary Examiner* — Md Azad
(74) *Attorney, Agent, or Firm* — Foley & Lardner LLP

(57) ABSTRACT

An extremum seeking controller includes a processing circuit configured to modulate a manipulated variable provided as an input to a plant using an extremum-seeking control technique to drive a gradient of an objective function with respect to the manipulated variable toward an extremum. The objective function includes a performance variable characterizing a performance of the plant responsive to the manipulated variable. The objective function also includes a saturation adjustment term that becomes active as the plant approaches a saturation point and remains active as the plant operates within a saturated region past the saturation point. The saturation adjustment term causes the processing circuit to adjust the manipulated variable toward a value of the manipulated variable that returns the plant from the saturated region to a non-saturated region.

20 Claims, 11 Drawing Sheets

(56) References Cited

U.S. PATENT DOCUMENTS

| | | | |
|---|---|---|---|
| 8,666,517 B2* | 3/2014 | Li | G05B 5/01 |
| | | | 700/38 |
| 9,835,349 B2 | 12/2017 | Salsbury et al. | |
| 10,197,977 B2 | 2/2019 | Salsbury et al. | |
| 10,209,684 B2 | 2/2019 | Salsbury et al. | |
| 2011/0276182 A1 | 11/2011 | Seem et al. | |
| 2012/0239165 A1 | 9/2012 | Li et al. | |
| 2013/0300115 A1 | 11/2013 | Seem et al. | |
| 2016/0132027 A1 | 5/2016 | Li et al. | |
| 2017/0002641 A1 | 1/2017 | Dykstra et al. | |
| 2017/0176954 A1 | 6/2017 | Salsbury et al. | |
| 2017/0241657 A1* | 8/2017 | Salsbury | F24F 11/62 |
| 2017/0241658 A1 | 8/2017 | Salsbury et al. | |
| 2017/0271877 A1 | 9/2017 | Stewart et al. | |
| 2018/0059626 A1* | 3/2018 | Jahanshahi | G05B 13/024 |
| 2018/0238169 A1 | 8/2018 | Sun et al. | |
| 2018/0299839 A1* | 10/2018 | Salsbury | G05B 13/022 |
| 2018/0340704 A1 | 11/2018 | Turney et al. | |
| 2019/0257544 A1 | 8/2019 | Alanqar et al. | |
| 2019/0302784 A1 | 10/2019 | Benosman et al. | |

OTHER PUBLICATIONS

Dehann et al., Extremum-seeking control of state-constrained nonlinear systems, Department of Chemical Engineering, Science Direct, vol. 41, No. 9, Sep. 1, 2005, pp. 1567-1574.*

Dong et al., "Constraint Handling in ESC Control Strategies with Application to HVAC Systems," 2018 Annual American Control Conference (ACC), Jun. 27-29, 2018, pp. 565-570.

Extended European Search Report, EP 18166329.5, dated Sep. 26, 2018, 7 pages.

Krstic, Miroslav, "Extremum Seeking Control for Discrete-Time Systems," IEEE Transactions on Automatic Control, 2002, 47 (2), pp. 318-323, Postprint available at http://repositories.edlib.org/postprints/396.

Larsson, Stefan, Literature Study for Extremum Control, Chalmers University of Technology, Nov. 1, 2001, 14 pages.

Li et al., "Extremum Seeking Control of a Tunable Thermoacoustic Cooler," IEEE Transactions on Control Systems Technology, vol. 13, No. 4, Jul. 2005, 10 pages.

Mu, Baojie et al., Optimization and Sequencing of Chilled-water Plant Based on Extremum Seeking Control, 2016 American Control Conference (ACC), Boston, MA, USA, Jul. 6-8, 2016, pp. 2373-2378.

Rotea, Mario, "Analysis of Multivariable Extremum Seeking Algorithms," Proceedings of the American Control Conference, Jun. 2000, 5 pages.

Wang et al., "Extremum Seeking for Limit Cycle Minimization," IEEE Transactions on Automatic Control, Dec. 2000, vol. 45, No. 12, 6 pages.

* cited by examiner

| Equipment Type | Manipulated Variable $u$ | Performance Variable $y$ |
|---|---|---|
| Chilled water plant | Condenser water temperature setpoint | Combined power of chiller compressor(s), condenser water pumps and cooling tower fans |
| Chilled water plant | Cooling tower fan speed and condenser water pump speed | Combined power of chiller compressor(s), condenser water pumps and cooling tower fans |
| Variable refrigerant flow system | Compressor suction or discharge pressure setpoint | Total system power |
| Variable refrigerant flow system | Compressor suction or discharge pressure setpoint, and superheat setpoint for indoor units in cooling mode | Total system power |
| General vapor compression air-conditioning system (e.g., rooftop unit) | Setpoint temperature of air leaving evaporator | Total system power |
| General vapor compression air-conditioning system (e.g., rooftop unit) | Compressor speed | Total system power |
| General vapor compression air-conditioning system (e.g., rooftop unit) | Evaporator fan speed | Total system power |
| General vapor compression air-conditioning system (e.g., rooftop unit) | Setpoint temperature of air leaving evaporator and condenser fan speed | Total system power |

FIG. 13

EXTREMUM-SEEKING CONTROL SYSTEM WITH SATURATION CONSTRAINTS

BACKGROUND

The present disclosure relates generally to control systems for an HVAC system. More particularly, the present disclosure relates to extremum-seeking control for an HVAC system.

Extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a mathematical model of the controlled system is not necessary for ESC to optimize the system.

ESC has been used in many different engineering applications (e.g., combustion, circuitry, mining, aerospace and land-based vehicles, building HVAC, wind and solar energy, etc.) and has been shown to be able to improve the operational efficiency and performance for these engineering applications. A variety of different types of ESC have been developed including dither ESC, switching ESC, sliding-mode ESC, adaptive ESC, among others. Each type of ESC has its respective advantages and disadvantages. Each of these approaches to ESC is implemented to drive a gradient of a control system to zero.

Typical ESC controllers operate by finding a gradient of a performance variable with respect to a manipulated variable associated with different building equipment configurations and constantly updating the manipulated variable until the gradient is driven to zero. The controllers generally update the configurations of pieces of building equipment before determining the gradient of associated performance variables.

SUMMARY

One implementation of the present disclosure is an extremum-seeking controller. The extremum seeking controller includes a processing circuit configured to modulate a manipulated variable provided as an input to a plant using an extremum-seeking control technique to drive a gradient of an objective function with respect to the manipulated variable toward an extremum. The objective function includes a performance variable characterizing a performance of the plant responsive to the manipulated variable. The objective function also includes a saturation adjustment term that becomes active as the plant approaches a saturation point and remains active as the plant operates within a saturated region past the saturation point. The saturation adjustment term causes the processing circuit to adjust the manipulated variable toward a value of the manipulated variable that returns the plant from the saturated region to a non-saturated region.

In some embodiments, the saturation adjustment term is based both on a value of a saturation variable affected by the manipulated variable and capable of becoming saturated at a subset of values of the manipulated variable and on a value of the manipulated variable at which the gradient is calculated relative to the value of the manipulated variable that returns the plant from the saturated region to the non-saturated region.

In some embodiments, the saturation adjustment term includes a barrier function that has a value of substantially zero when the plant operates within the non-saturated region and increases as the plant approaches the saturated region. In some embodiments, the gradient of the objective function with respect to the manipulated variable include a first gradient of the performance variable with respect to the manipulated variable and a second gradient of a saturation variable with respect to the manipulated variable, with the second gradient being substantially zero when the saturation variable is saturated.

In some embodiments, the gradient of the objective function with respect to the manipulated variable includes a difference between (1) a value of the manipulated variable at which the gradient is calculated and (2) the value of the manipulated variable that returns the plant to the non-saturated region. In some embodiments, the manipulated variable includes a fan speed and the performance variable includes a system power. In some embodiments, the manipulated variable includes a compressor suction or discharge pressure setpoint.

Another implementation of the present disclosure is an extremum-seeking controller including a processing circuit. The processing circuit is configured to modulate a manipulated variable provided as an input to a plant using an extremum-seeking control technique to drive a gradient of an objective function with respect to the manipulated variable toward an extremum. The objective function includes a performance variable characterizing a performance of the plant responsive to the manipulated variable and a saturation adjustment term based on both a value of a saturation variable capable of becoming saturated at a subset of values of the manipulated variable and a value of the manipulated variable at which the gradient is calculated relative to a value of the manipulated variable at which the saturation variable is non-saturated.

In some embodiments, the saturation adjustment term includes a barrier function that that has a value of substantially zero when the saturation variable is non-saturated and increases as the saturation variable becomes saturated. In some embodiments, the saturation adjustment term causes the processing circuit to adjust the manipulated variable toward the value of the manipulated variable at which the saturation variable is non-saturated.

In some embodiments, the gradient of the objective function with respect to the manipulated variable includes a first gradient of the performance variable with respect to the manipulated variable and a second gradient of the saturation variable with respect to the manipulated variable. The second gradient being substantially zero when the saturation variable is saturated.

In some embodiments, the gradient of the objective function with respect to the manipulated variable includes a difference between the value of the manipulated variable at which the gradient is calculated and the value of the manipulated variable at which the saturation variable is non-saturated. In some embodiments, the manipulated variable includes a fan speed and the performance variable includes a system power.

Another implementation of the present disclosure is a real-time optimization controller that includes a processing circuit. The processing circuit is configured to provide a value of manipulated variable as an input to a plant and obtain (1) a value of a performance variable characterizing a performance of the plant responsive to the manipulated variable and (2) a value of a saturation variable affected by the manipulated variable and capable of becoming saturated at a subset of values of the manipulated variable. The processing circuit is also configured to evaluate an objective function including a performance variable term and a saturation adjustment term, the performance variable term including the performance variable, and the saturation adjustment term including (1) a function of the saturation variable and (2) a function of the value of manipulated variable provided as the input to the plant relative to a value of the manipulated variable at which the saturation variable is non-saturated. The processing circuit is also configured to adjust the value of the manipulated variable provided as the input to the plant using a real-time optimization technique to drive a gradient of the objective function with respect to the manipulated variable toward an extremum.

In some embodiments, the real-time optimization technique is an extremum-seeking control technique. In some embodiments, the function of the saturation variable includes a barrier function that has a value of substantially zero when the saturation variable is within a predefined range and increases based on an amount the saturation variable deviates from the predefined range. In some embodiments, the function of the manipulated variable causes the processing circuit to adjust the manipulated variable toward the value of the manipulated variable at which the saturation variable is non-saturated.

In some embodiments, the gradient of the objective function with respect to the manipulated variable includes a first gradient of the performance variable with respect to the manipulated variable and a second gradient of the saturation variable with respect to the manipulated variable, the second gradient being substantially zero when the saturation variable is saturated.

In some embodiments, the gradient of the objective function with respect to the manipulated variable includes a difference between the value of the manipulated variable provided as the input to the plant and the value of the manipulated variable at which the saturation variable is non-saturated. In some embodiments, the manipulated variable includes a fan speed and the performance variable includes a system power.

BRIEF DESCRIPTION OF THE DRAWINGS

FIG. 13 is a table of the equipment and variables used in various embodiments disclosed herein, according to an exemplary embodiment.

DETAILED DESCRIPTION

Overview

Referring generally to the FIGURES, various extremum-seeking control (ESC) systems and methods are shown, according to some embodiments. In general, ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure.

Optimization of system performance can be obtained by driving the gradient towards zero by using a feedback loop in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, 8,027,742, 8,200,345, 8,200,344, U.S. patent application Ser. No. 14/495,773, U.S. patent application Ser. No. 14/538,700, U.S. patent application Ser. No. 14/975,527, and U.S. patent application Ser. No. 14/961,747. Each of these patents and patent applications is incorporated by reference herein.

Building HVAC Systems and Building Management Systems

Figure 1:
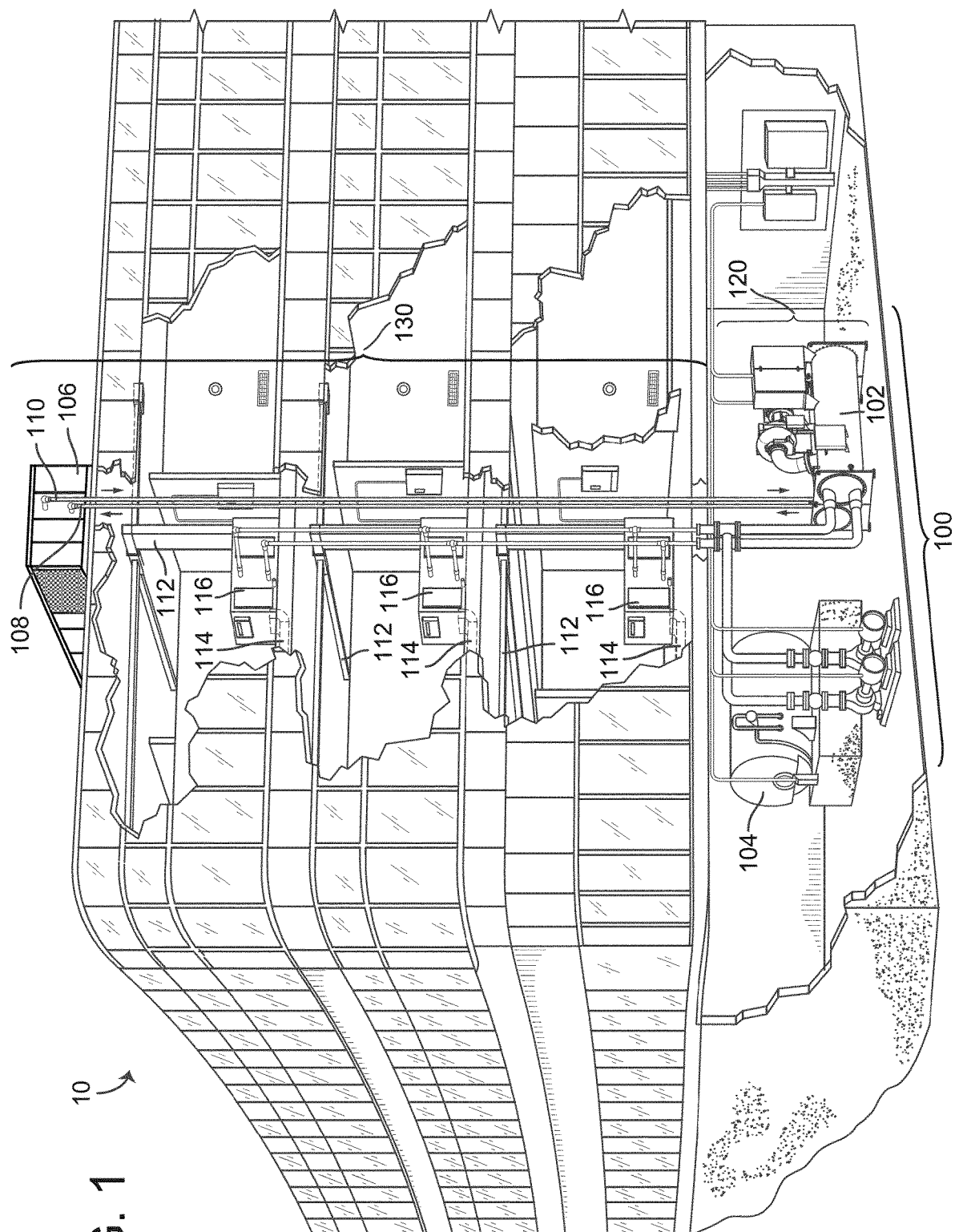
FIG. 1 is a drawing of a building equipped with a HVAC system, according to some embodiments.
Figure 2:
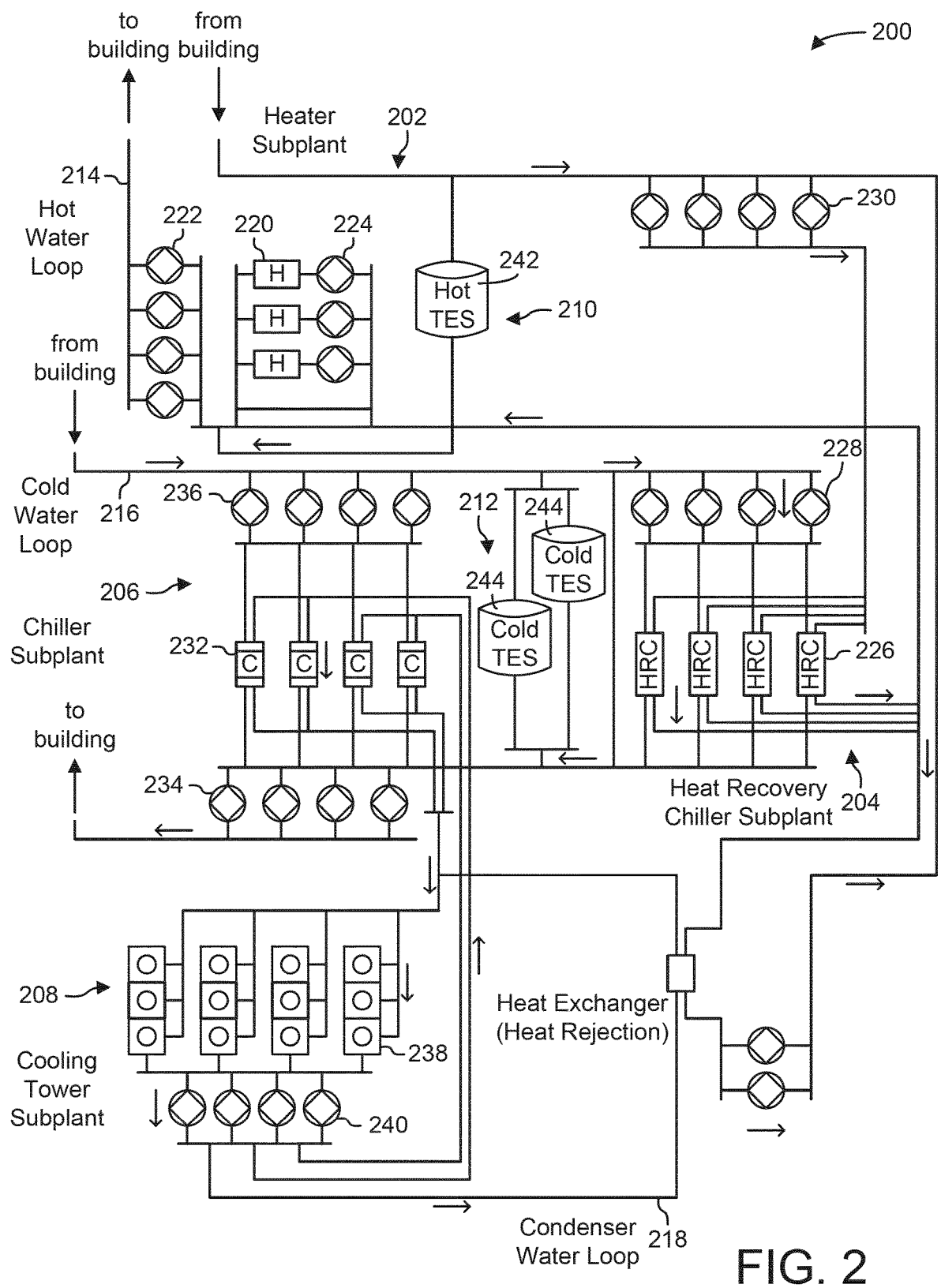
FIG. 2 is a block diagram of a waterside system which can be used to serve the building of FIG. 1, according to some embodiments.
Figure 3:
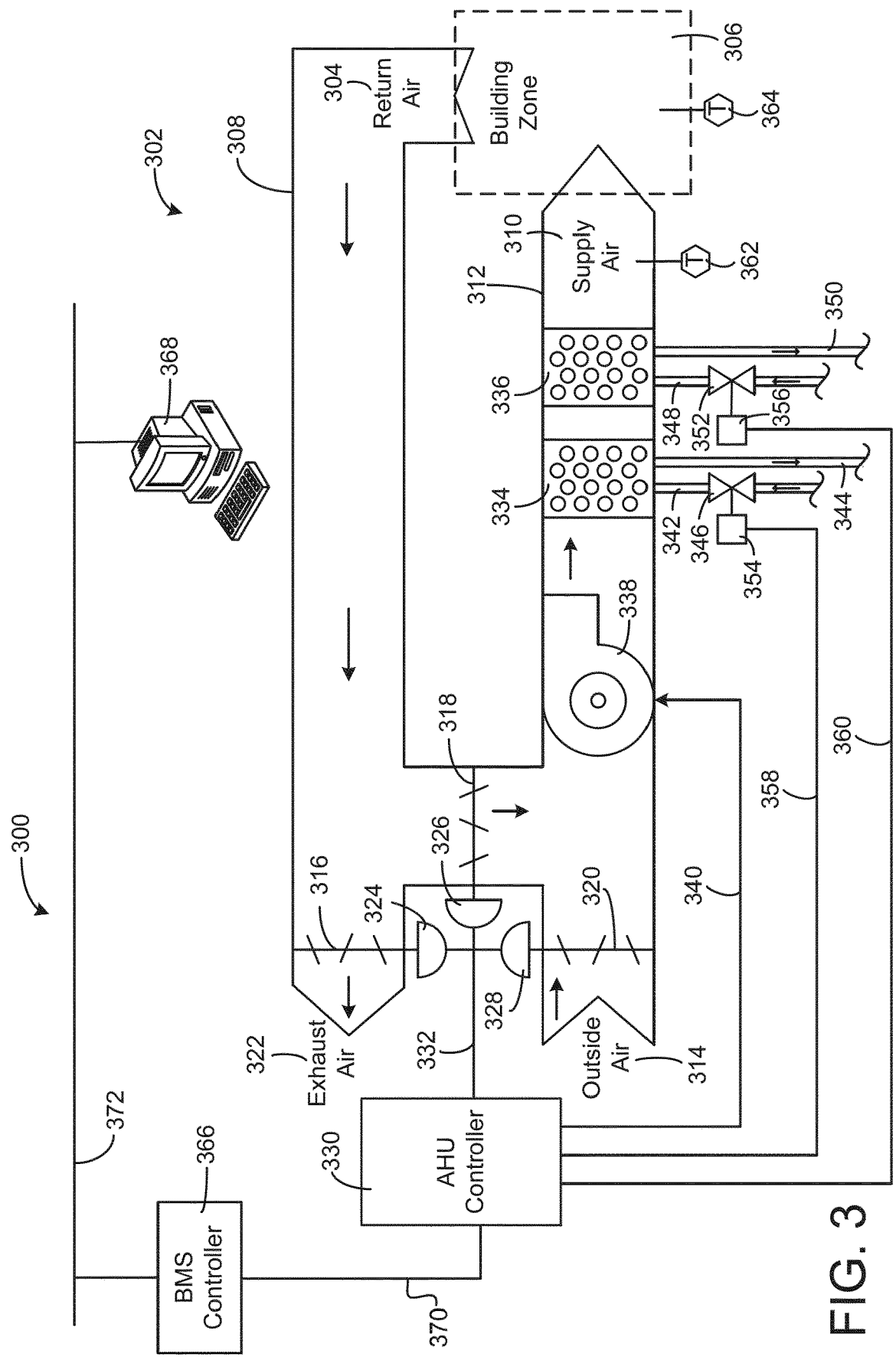
FIG. 3 is a block diagram of an airside system which can be used to serve the building of FIG. 1, according to some embodiments.
Figure 4:
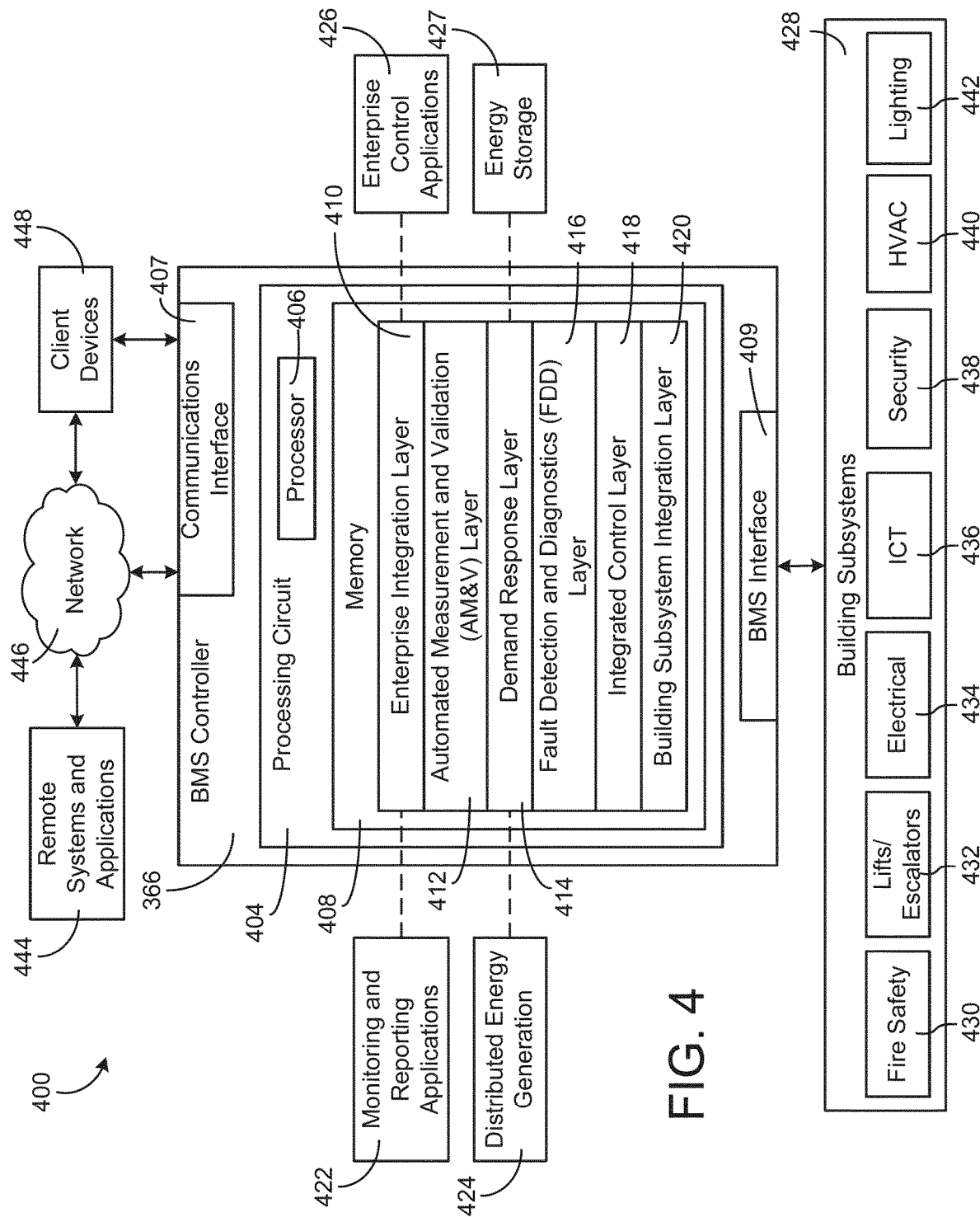
FIG. 4 is a block diagram of a building management system (BMS) which can be used to monitor and control the building of FIG. 1, according to some embodiments.
Figure 5:
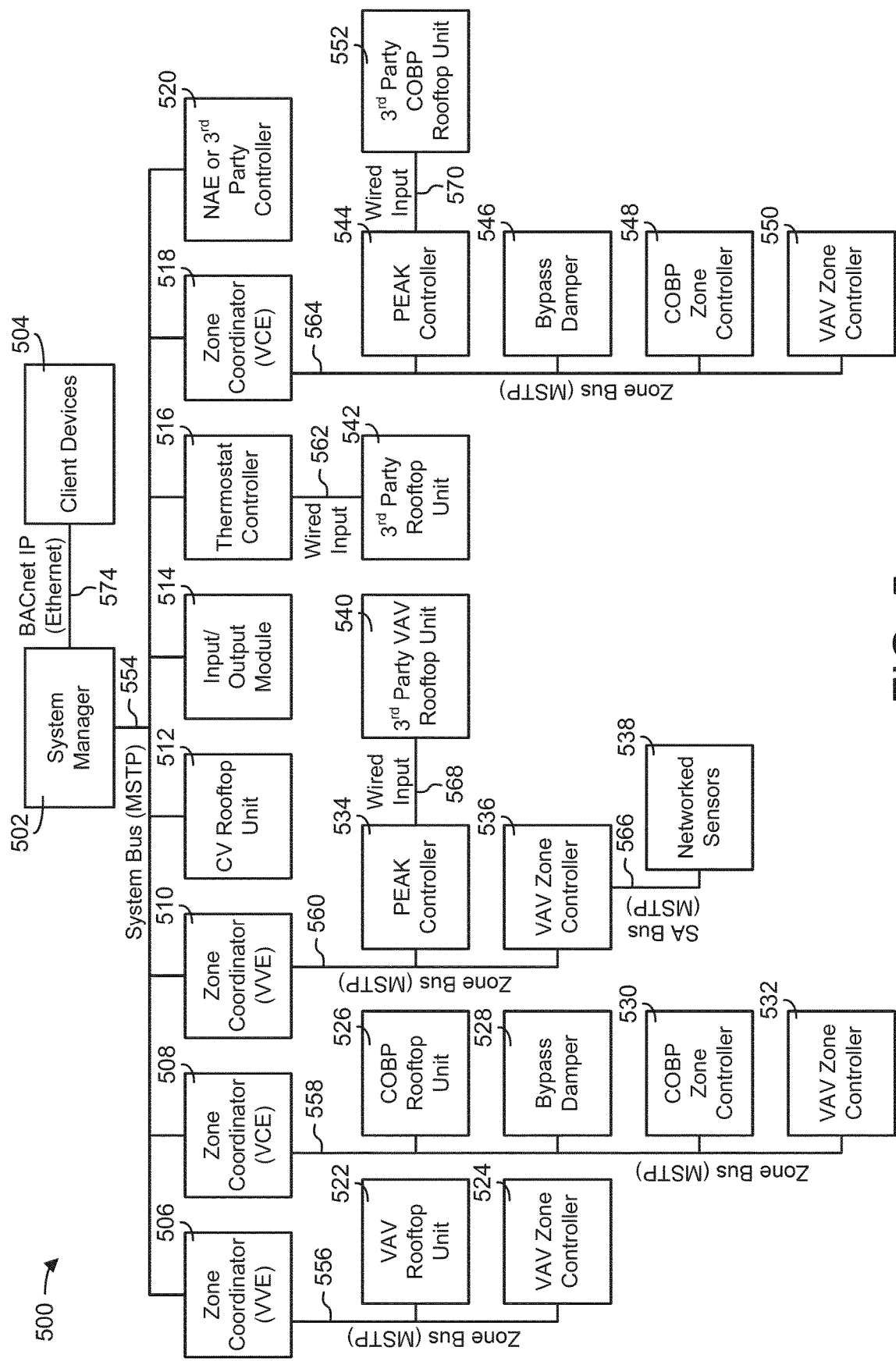
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220.

Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, ESC algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum-seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Extremum-Seeking Control Systems

Figure 6:
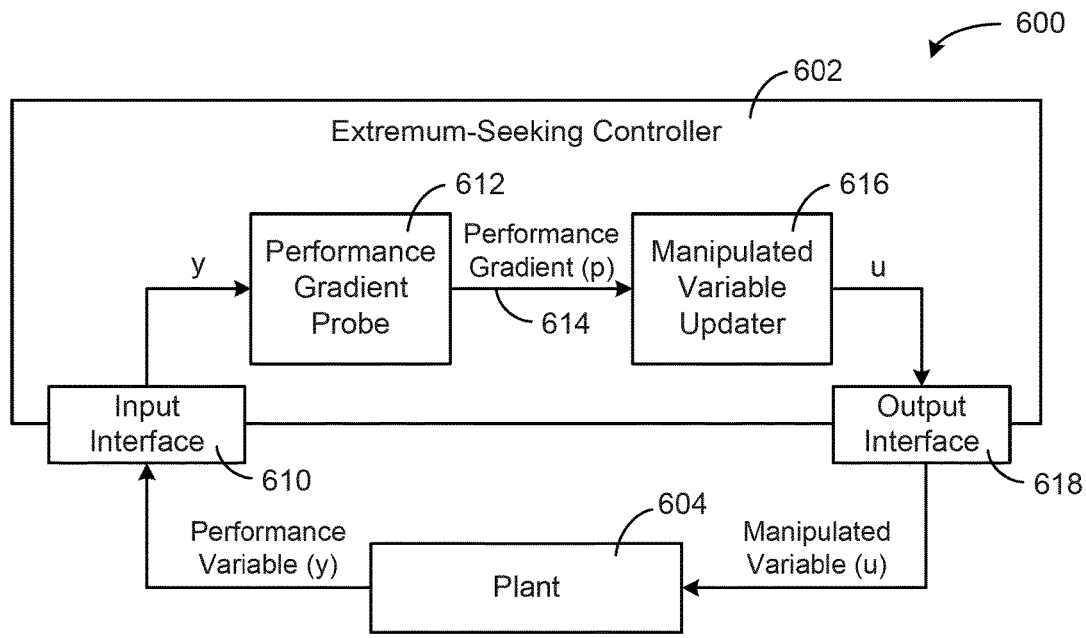
FIG. 6 is a block diagram of an extremum-seeking control (ESC) system which uses a periodic dither signal to perturb a control input provided to a plant, according to some embodiments.

Referring now to FIG. 6, a block diagram of an extremum-seeking control (ESC) system 600 with a periodic dither signal is shown, according to some embodiments. ESC system 600 is shown to include an extremum-seeking controller 602 and a plant 604. A plant in control theory is the combination of a process and one or more mechanically-controlled outputs. For example, plant 604 can be an air handling unit configured to control temperature within a building space via one or more mechanically-controlled actuators and/or dampers. In various embodiments, plant 604 can include a chiller operation process, a damper adjustment process, a mechanical cooling process, a ventilation process, a refrigeration process, or any other process in which an input variable to plant 604 (i.e., manipulated variable u) is adjusted to affect an output from plant 604 (i.e., performance variable y).

Extremum-seeking controller 602 uses extremum-seeking control logic to modulate the manipulated variable u. For example, controller 602 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 602 uses extremum-seeking control logic to determine a value for the manipulated variable u that drives the performance gradient p to zero.

Controller 602 may determine the DC value of manipulated variable u based on a measurement or other indication of the performance variable y received as feedback from plant 604 via input interface 610. Measurements from plant 604 can include, but are not limited to, information received from sensors about the state of plant 604 or control signals sent to other devices in the system. In some embodiments, the performance variable y is a measured or observed position of one of valves 354-356. In other embodiments, the performance variable y is a measured or calculated amount of power consumption, a fan speed, a damper position, a temperature, or any other variable that can be measured or calculated by plant 604. Performance variable y can be the variable that extremum-seeking controller 602 seeks to optimize via an extremum-seeking control technique. Performance variable y can be output by plant 604 or observed at plant 604 (e.g., via a sensor) and provided to extremum-seeking controller 602 at input interface 610.

Input interface 610 provides the performance variable y to performance gradient probe 612 to detect the performance gradient 614. Performance gradient 614 may indicate a slope of the function $y=f(u)$, where y represents the performance variable received from plant 604 and u represents the manipulated variable provided to plant 604. When performance gradient 614 is zero, the performance variable y has an extremum value (e.g., a maximum or minimum). Therefore, extremum-seeking controller 602 can optimize the value of the performance variable y by driving performance gradient 614 to zero.

Manipulated variable updater 616 produces an updated manipulated variable u based upon performance gradient 614. In some embodiments, manipulated variable updater 616 includes an integrator to drive performance gradient 614 to zero. Manipulated variable updater 616 then provides an updated manipulated variable u to plant 604 via output interface 618. In some embodiments, manipulated variable u is provided to one of dampers 324-328 (FIG. 2) or an actuator affecting dampers 324-328 as a control signal via output interface 618. Plant 604 can use manipulated variable u as a setpoint to adjust the position of dampers 324-328 and thereby control the relative proportions of outdoor air 314 and return air 304 provided to a temperature-controlled space.

Figure 7:
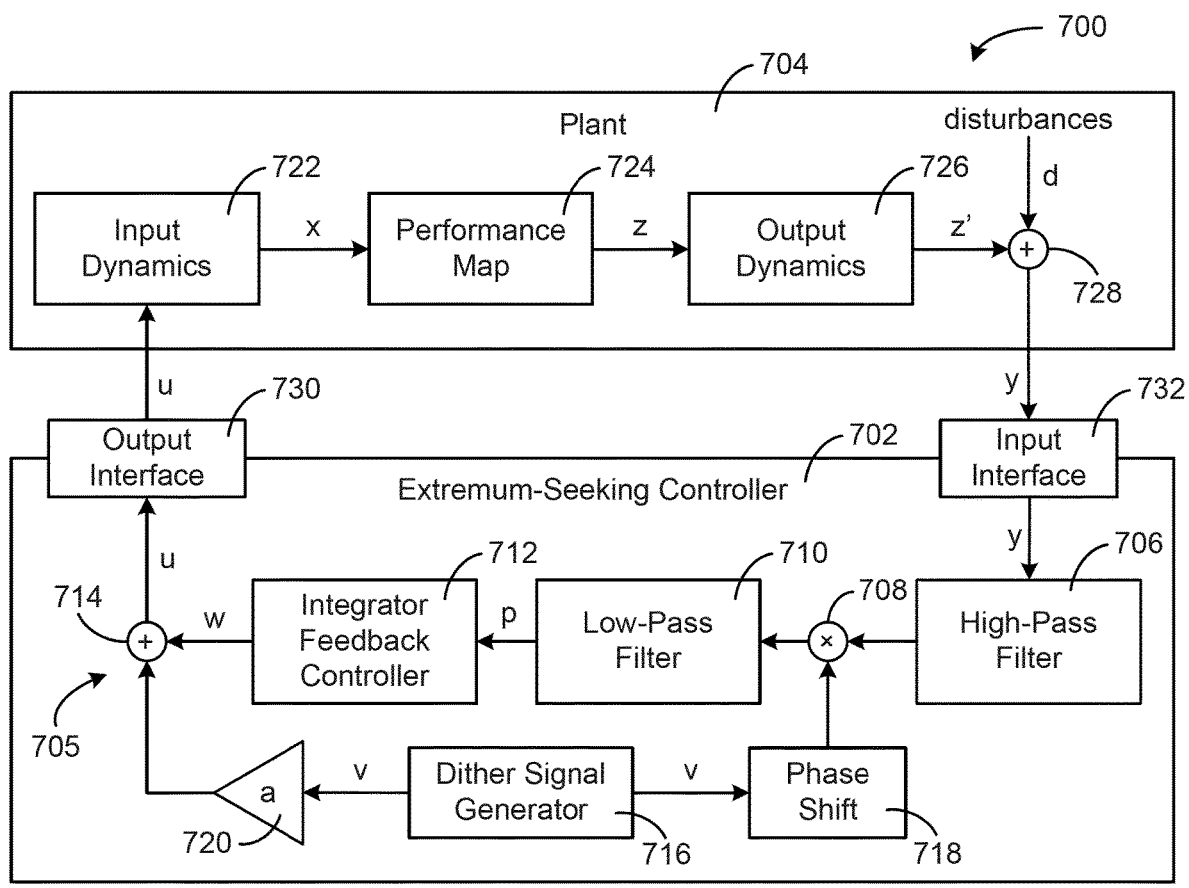
FIG. 7 is a block diagram of another ESC system which uses a periodic dither signal to perturb a control input provided to a plant, according to some embodiments.

Referring now to FIG. 7, a block diagram of another ESC system 700 with a periodic dither signal is shown, according to some embodiments. ESC system 700 is shown to include a plant 704 and an extremum-seeking controller 702. Controller 702 uses an extremum-seeking control strategy to optimize a performance variable y received as an output from plant 704. Optimizing performance variable y can include minimizing y, maximizing y, controlling y to achieve a setpoint, or otherwise regulating the value of performance variable y.

Plant 704 can be the same as plant 604 or similar to plant 604, as described with reference to FIG. 3. For example, plant 704 can be a combination of a process and one or more mechanically-controlled outputs. In some embodiments, plant 704 is an air handling unit configured to control temperature within a building space via one or more mechanically-controlled actuators and/or dampers. In other embodiments, plant 704 can include a chiller operation process, a damper adjustment process, a mechanical cooling process, a ventilation process, or any other process that generates an output based on one or more control inputs.

Plant 704 can be represented mathematically as a combination of input dynamics 722, a performance map 724, output dynamics 726, and disturbances d. In some embodiments, input dynamics 722 are linear time-invariant (LTI) input dynamics and output dynamics 726 are LTI output dynamics. Performance map 724 can be a static nonlinear performance map. Disturbances d can include process noise, measurement noise, or a combination of both. Although the components of plant 704 are shown in FIG. 7, it should be noted that the actual mathematical model for plant 704 does not need to be known in order to apply ESC.

Plant 704 receives a control input u (e.g., a control signal, a manipulated variable, etc.) from extremum-seeking controller 702 via output interface 730. Input dynamics 722 may use the control input u to generate a function signal x based on the control input (e.g., $x=f(u)$). Function signal x may be passed to performance map 724 which generates an output signal z as a function of the function signal (i.e., $z=f(x)$). The output signal z may be passed through output dynamics 726 to produce signal z', which is modified by disturbances d at element 728 to produce performance variable y (e.g., $y=z'+d$). Performance variable y is provided as an output from plant 704 and received at extremum-seeking controller 702. Extremum-seeking controller 702 may seek to find values for x and/or u that optimize the output z of performance map 724 and/or the performance variable y.

Still referring to FIG. 7, extremum-seeking controller 702 is shown receiving performance variable y via input interface 732 and providing performance variable y to a control loop 705 within controller 702. Control loop 705 is shown to include a high-pass filter 706, a demodulation element 708, a low-pass filter 710, an integrator feedback controller 712, and a dither signal element 714. Control loop 705 may be configured to extract a performance gradient p from performance variable y using a dither-demodulation technique. Integrator feedback controller 712 analyzes the performance gradient p and adjusts the DC value of the plant input (i.e., the variable w) to drive performance gradient p to zero.

The first step of the dither-demodulation technique is performed by dither signal generator 716 and dither signal element 714. Dither signal generator 716 generates a periodic dither signal v, which is typically a sinusoidal signal. Dither signal element 714 receives the dither signal v from dither signal generator 716 and the DC value of the plant input w from controller 712. Dither signal element 714 combines dither signal v with the DC value of the plant input w to generate the perturbed control input u provided to plant 704 (e.g., u=w+v). The perturbed control input u is provided to plant 704 and used by plant 704 to generate performance variable y as previously described.

The second step of the dither-demodulation technique is performed by high-pass filter 706, demodulation element 708, and low-pass filter 710. High-pass filter 706 filters the performance variable y and provides the filtered output to demodulation element 708. Demodulation element 708 demodulates the output of high-pass filter 706 by multiplying the filtered output by the dither signal v with a phase shift 718 applied. The DC value of this multiplication is proportional to the performance gradient p of performance variable y with respect to the control input u. The output of demodulation element 708 is provided to low-pass filter 710, which extracts the performance gradient p (i.e., the DC value of the demodulated output). The estimate of the performance gradient p is then provided to integrator feedback controller 712, which drives the performance gradient estimate p to zero by adjusting the DC value w of the plant input u.

Still referring to FIG. 7, extremum-seeking controller 702 is shown to include an amplifier 720. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 604 to enhance the effect of the dither signal v on the performance variable y. It can be difficult and challenging to properly select the dither frequency $\omega_v$ without knowledge of the dynamics of plant 704. For these reasons, the use of a periodic dither signal v is one of the drawbacks of traditional ESC.

In ESC system 700, the output of high-pass filter 706 can be represented as the difference between the value of the performance variable y and the expected value of the performance variable y, as shown in the following equation:

$$\text{Output of High-Pass Filter: } y - E[y] \tag{1}$$

where the variable E [y] is the expected value of the performance variable y. The result of the cross-correlation performed by demodulation element 708 (i.e., the output of demodulation element 708) can be represented as the product of the high-pass filter output and the phase-shifted dither signal, as shown in the following equation:

$$\text{Result of Cross-Correlation: } (y-E[y])(v-E[v]) \tag{2}$$

where the variable E [v] is the expected value of the dither signal v. The output of low-pass filter 710 can be represented as the covariance of the dither signal v and the performance variable y, as shown in the following equation:

$$\text{Output of Low-Pass Filter: } E[(y-E[y])(v-E[u])]$$
$$\equiv \text{Cov}(v,y) \tag{3}$$

where the variable E [u] is the expected value of the control input u.

The preceding equations show that ESC system 700 generates an estimate for the covariance Cov(v, y) between the dither signal v and the plant output (i.e., the performance variable y). The covariance Cov(v, y) can be used in ESC system 700 as a proxy for the performance gradient p. For example, the covariance Cov(v, y) can be calculated by high-pass filter 706, demodulation element 708, and low-pass filter 710 and provided as a feedback input to integrator feedback controller 712. Integrator feedback controller 712 can adjust the DC value w of the plant input u in order to minimize the covariance Cov(v, y) as part of the feedback control loop.

Figure 8:
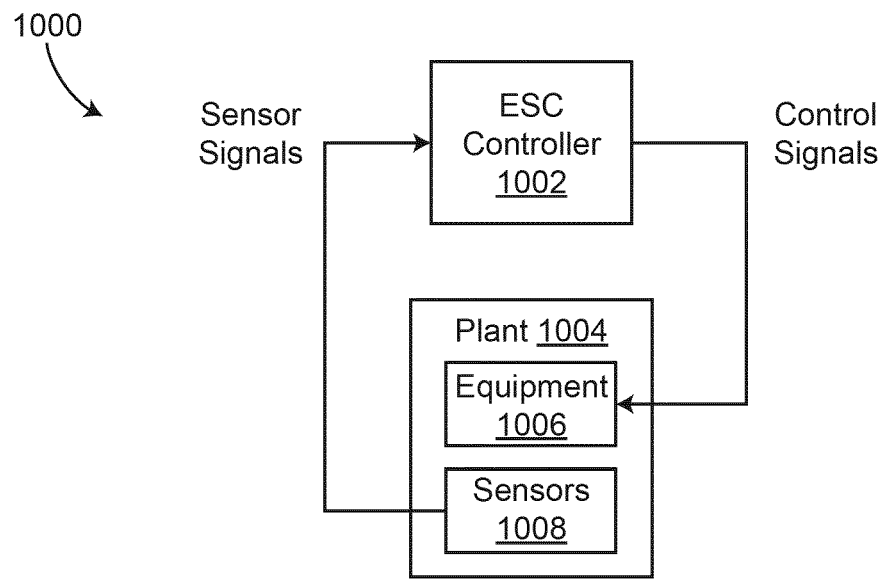
FIG. 8 is a block diagram of a control system for a plant including a controller configured to operate equipment that affects a performance variable of the plant, according to some embodiments.

Referring now to FIG. 8, a diagram of a system 1000 with extremum-seeking control (ESC) is shown, according to an exemplary embodiment. FIG. 8 shows the main components used in ESC. The system 1000 includes an ESC controller 1002 and a plant 1004. The plant 1004 includes equipment 1006 and sensors 1008, where the equipment 1006 is operable to affect one or more properties measured (sensed, determined, tracked, assessed, counted, etc.) by the sensors 1008. For example, the equipment 1006 may be HVAC equipment for a building, and the sensors 1008 may measure air temperature in a building zone, power consumption of the equipment 1006, and/or other properties.

The sensors 1008 output sensor signals that are indicative of values of the properties measured by the sensors. The sensor signals are provided to the ESC controller 1002, which uses the sensors signals as described elsewhere herein to generate control signals (e.g., control inputs u) for the equipment 1006. As illustrated in FIG. 8, the control signals are transmitted from the ESC controller 1002 to the equipment 1006. The equipment 1006 is thereby controlled by the ESC controller 1002 based on the sensor signals 1008, such that FIG. 8 illustrates a control loop used in ESC.

Figure 9:
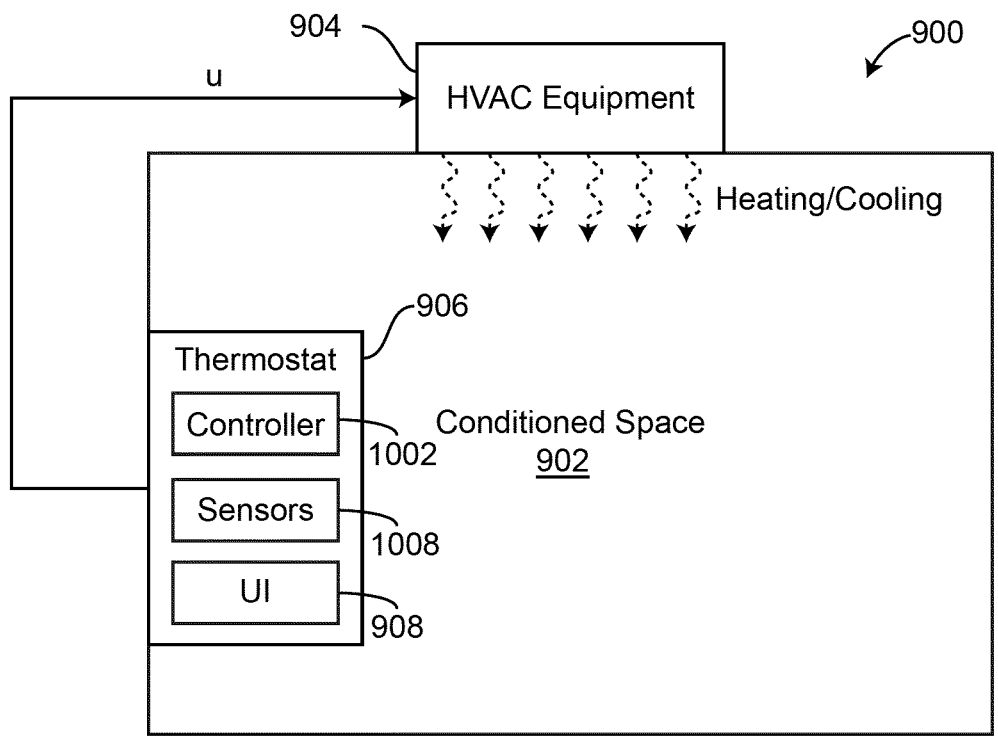
FIG. 9 is a block diagram of a control system for a conditioned space including HVAC equipment that is operated by a controller and configured to affect an environmental condition of the conditioned space, according to some embodiments.

Referring now to FIG. 9, an example implementation of the ESC system 1000 of FIG. 8 is shown, according to an exemplary embodiment. FIG. 9 shows an HVAC system 900 that includes HVAC equipment 904 that operates to providing heating and/or cooling to a conditioned space 902. The HVAC equipment 904 receives control inputs u from a thermostat 906. The thermostat 906 is shown to include embodiments of the ESC controller 1002 and the sensors 1008. The sensors 1008 can measure attributes of the conditioned space 902 (e.g., air temperature, humidity) and provide those measurements to the controller 1002, which uses the measurements to generate the control inputs u.

The thermostat 906 is also shown to include a user interface 908. The user interface 908 may be configured to allow a user to set various user preferences. For example, a user may be able to select a temperature set point or range of comfortable temperatures via the user interface 908. In some embodiments, the user interface 908 is configured to allow a user to input one or more parameters of an extremum-seeking control approach which are described as user-selectable elsewhere herein. The thermostat 906 is thereby configured to provide extremum-seeking control for the HVAC equipment 904 that serves the conditioned space 902, for example without any modification or changes to a user's existing HVAC equipment 904.

Extremum Seeking Control System with Constraint Handling

Figure 10:
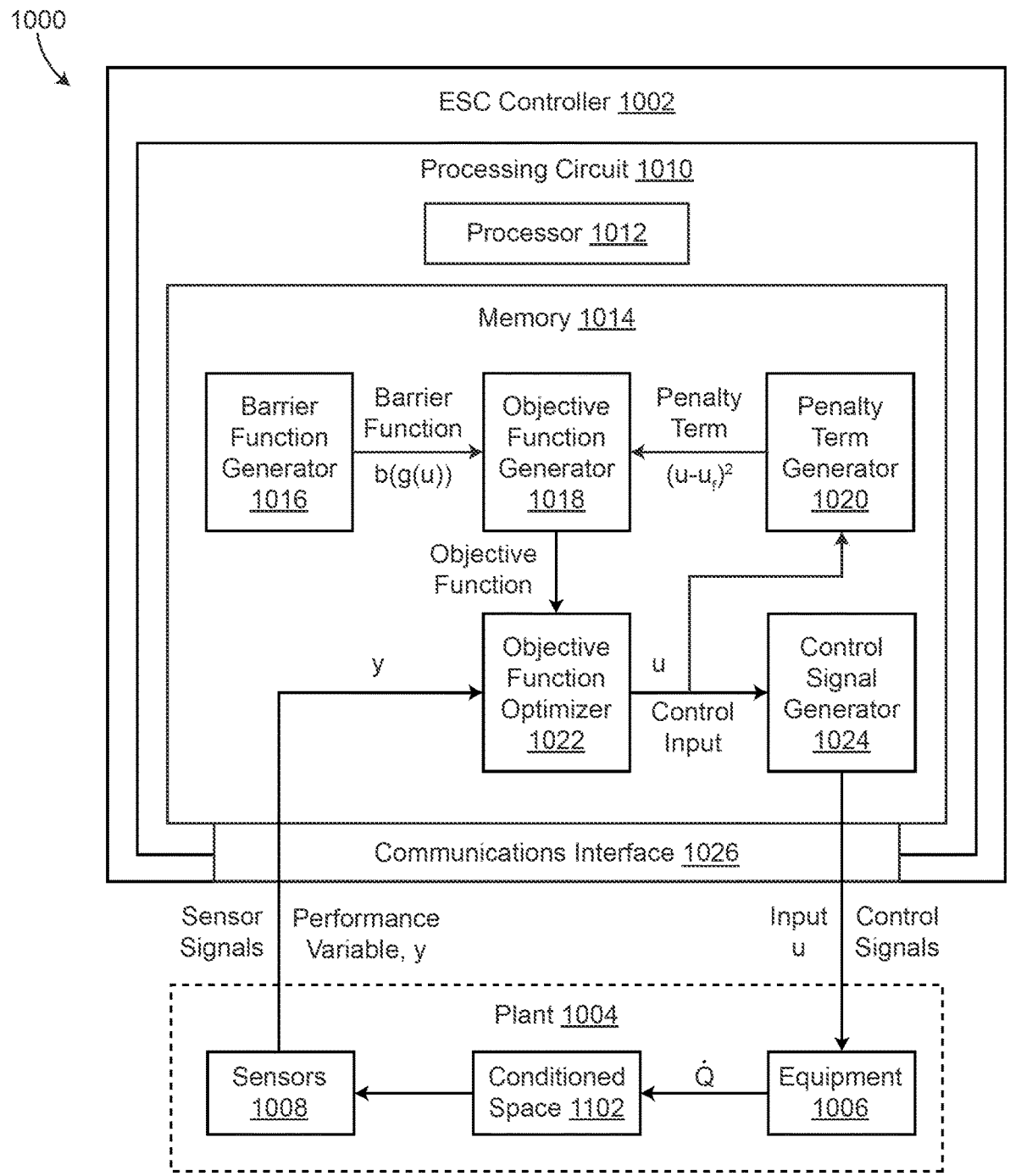
FIG. 10 is a block diagram of an extremum-seeking control system, according to an exemplary embodiment.

Referring particularly to FIG. 10, system 1000 includes ESC controller 1002 that is configured to generate control signals for equipment 1006 of plant 1004. In some embodiments, equipment 1006 is HVAC equipment 1104 and is configured to provide heating and/or cooling to conditioned space 902. In some embodiments, equipment 1006 is configured to affect an environmental condition or a variable condition of conditioned space 902 or plant 1004. For example, equipment 1006 can be configured to affect a value of the performance variable y. In some embodiments, ESC controller 1002 is configured to perform any of the functionality of ESC controller 602 and/or ESC controller 702, and plant 1004 may be the same as or similar to plant 604 and/or plant 704.

In some embodiments, ESC controller 1002 is configured to operate to perform ESC-based optimization of a non-linear system that has the form:

$$\dot{x} = f(x, u) \quad (4)$$

$$y = h(x) \quad (5)$$

where $x \in \mathbb{R}^n$ and is a vector of state variables, $u \in \mathbb{R}^p$ is a vector of input variables or control inputs, and $y \in \mathbb{R}$ is the performance variable (e.g., the variable to be minimized or optimized).

An equilibrium or steady-state map of the state variables x is an n dimensional vector $\pi(u)$ such that:

$$\dot{x} = f(\pi(u), u) = 0 \quad (6)$$

according to some embodiments. In this way, the stead-state map $\pi(u)$ may result in a rate of change of the state variables x (i.e., $\dot{x}$) being substantially equal to zero.

The equilibrium value of the performance variable y is defined as:

$$y = h(\pi(u)) = \ell(u) \quad (7)$$

according to some embodiments. In some embodiments, the equilibrium value of the performance variable y is the resulting value of the performance variable y for the steady-state map $\pi(u)$ of the state variables x.

Figure 11:
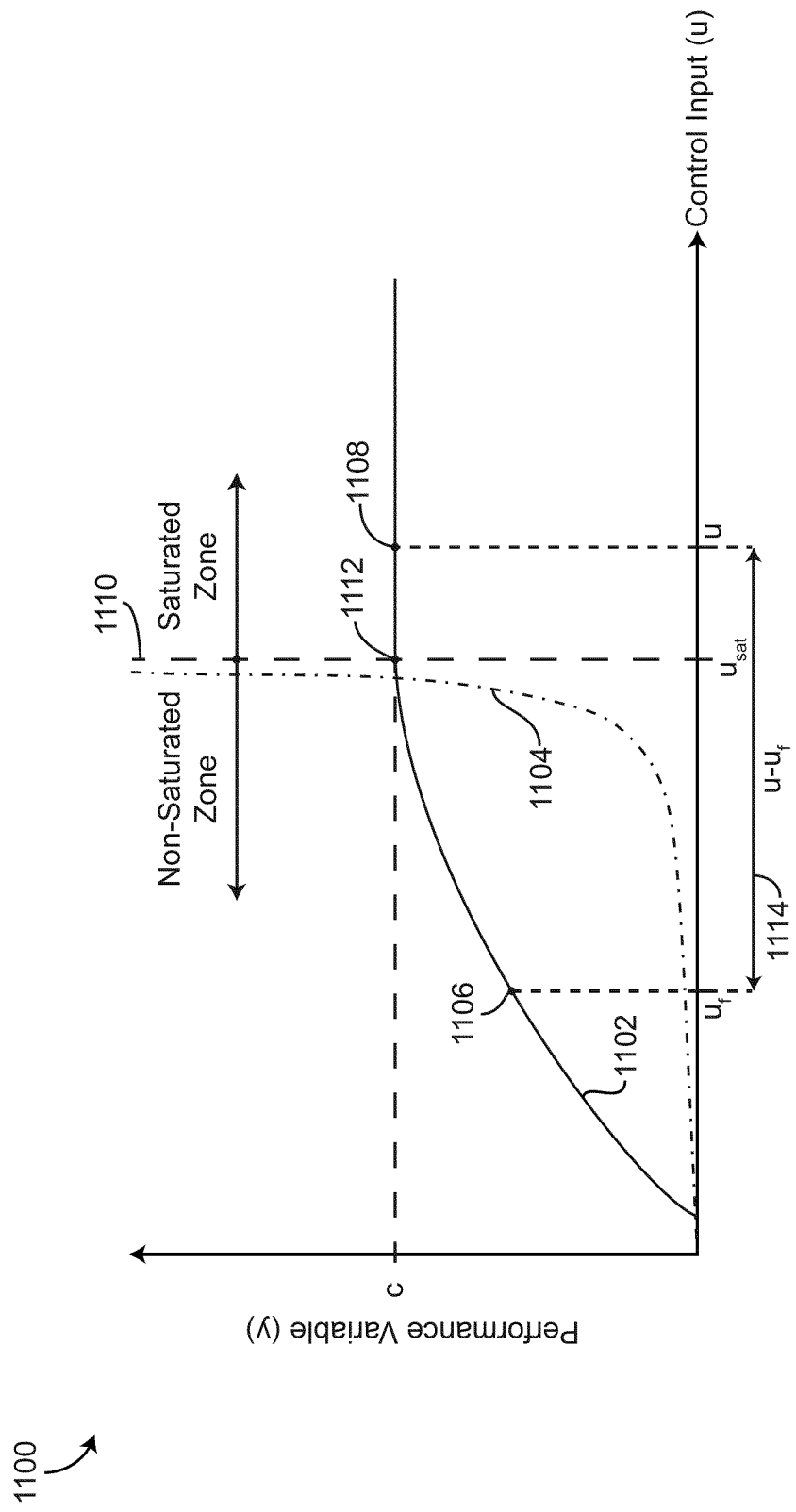
FIG. 11 is a graph illustrating example functions of the extremum-seeking control processes described herein, according to an exemplary embodiment.

Referring particularly to FIG. 11, a graph 1100 demonstrates saturation of the performance variable y (the Y-axis) with respect to the control input u, according to some embodiments. Saturation may occur when the performance variable y does not change with respect to changes in the control input u. It should be understood that while FIG. 11 shows saturation of the performance variable y with respect to the control input u, any other internal parameter, measured variable, cost variable, etc., of any of the systems or plants described herein may also saturate with respect to the control input u.

Graph 1100 includes series 1102 which illustrates a relationship between the performance variable y and the control input u, according to some embodiments. It should be understood that while series 1102 demonstrates only one possible relationship between the performance variable y and the control input u including a non-saturated zone and a saturated zone for explanatory purposes of variable saturation, various other relationships between the performance variable y and the control input u that result in saturation are possible.

Graph 1100 includes a saturation point 1112, according to some embodiments. The saturation point 1112 is defined by a corresponding value of the control input $u = u_{sat}$, and a corresponding value of the performance variable $y = c$. In some embodiments, the non-saturated zone is defined as any regions, states, areas, etc., when the control input u is less than the saturation point 1112 (e.g., when $u < u_{sat}$) and the saturated zone is defined as regions, states, areas, etc., when the control input u is greater than the saturation point 1112 (e.g., when $u > u_{sat}$).

In the non-saturated zone, the performance variable y changes with respect to changes in the control input u. For example, increasing the value of the control input u may increase or decrease the value of the performance variable y (e.g., depending on the relationship between the performance variable y and the control input u). Likewise, decreasing the value of the control input u may increase or decrease the value of the performance variable y. In some embodiments, series 1102 has a slope (e.g., a constant slope, a positive slope, a changing slope, a negative slope, etc.) that is non-zero in the non-saturated zone. In the saturated zone, the slope of series 1102 is substantially equal to zero so that changes in the control input u do not result in changes in the performance variable y.

When the control input u is driven into the saturated zone, gradient descent or ascent control systems (e.g., ESC) may have difficulty determining or finding an optimal operating point of the control input u. If the gradient-based control system uses the slope or gradient of the performance variable y with respect to the control input u, the gradient-based control system may be unable to determine which direction to adjust the control input u (e.g., increase or decrease) to move out of the saturated zone. The systems and methods described herein advantageously may dis-incentivize operation in the saturated zone, while allowing the control input u to transition into the saturated zone if the most cost-effective or optimal solution lies at or in the saturated zone.

Referring again to FIG. 10, ESC controller 1002 can operate to drive the system 1000 (e.g., the non-linear system represented in Equations (4) and (5) above) towards or to an optimal equilibrium state x* and u* (e.g., x=x* and u=u*) using a single inequality constraint and a single search variable u (i.e., the control input u). For example, ESC controller 1002 may be configured to perform the optimization:

$$\underset{u}{\text{minimize}} \quad \ell(u) \quad (8)$$

$$\text{subject to:} \quad g(u) \leq c \quad (9)$$

where g(u) is a parameter that may saturate or cause saturation (e.g., an internal parameter, the performance variable y, etc.) and is constrained to being less than or equal to a saturation value c (e.g., the value of the performance variable at saturation point 1112 as shown in FIG. 11). For example, if the parameter g(u) is the performance variable y that can saturate, c is a corresponding value that defines a saturated zone.

In some embodiments, the optimization represented in Equations (8) and (9) above can be transformed into an unconstrained optimization function by using a barrier function of the parameter g(u) shown in Equation (10) below:

$$\operatorname*{minimize}_{u} \ell(u) + \mu b(g(u)) \quad (10)$$

where $b(g(u))$ is a barrier function and $\mu$ is a scale adjustment parameter.

Referring to FIGS. 10 and 11, graph 1100 includes a series 1104 that illustrates the barrier function $b(g(u))$. In some embodiments, the barrier function is a logarithmic function:

$$b(g(u)) = -\log(c - g(u)) \quad (11)$$

and asymptotically approaches saturation point 1112, shown as asymptote 1110. However, the optimization problem represented by Equations (10) and (11) may be difficult to enforce for gradient-based optimization/control systems, since gradient-based optimization/control systems often optimize dynamic systems.

In some embodiments, the barrier function $b(g(u))$ is modified to allow the constraints (e.g., $g(u) \leq c$) to be violated during optimization, while incurring a penalty. For example, the barrier function and the optimization problem (e.g., the objective function of Equation (8)) may be modified to result in the following optimization problem:

$$\operatorname*{minimize}_{u} \ell(u) = \ell_1(u) + \ell_2(g(u)) \quad (12)$$

$$\text{subject to:} \quad g(u) \leq c \quad (13)$$

where $\ell_1(u)$ is a first portion of the objective function $\ell(u)$, and $\ell_2(g(u))$ is a second portion of the objective function $\ell(u)$. In this way, the objective function (e.g., Equation (12), $\ell(u)$) may be expressed as a function of the constraint functions (e.g., Equation (13)).

However, many of the constraints in ESC optimization problems may relate to variables that can saturate. For example, if the optimization problem defined in Equations (12) and (13) are used to minimize a total power consumption in a refrigeration system that includes a fan and a compressor, the variable u is the control input or the manipulated variable adjusted by ESC (e.g., by ESC controller 1002) such as an internal setpoint in the system. Separate controllers may be used to regulate the fan and compressor, and using the optimization problem defined in Equations (12) and (13), these controllers may be at risk of saturation if u is driven into an unfeasible region. For example, if g(u) is a control signal that is provided to the fan, then c may be an upper saturation bound of g(u). ESC controller 1002 may determine the gradient of the objective function (i.e., Equation (12)) relative to the manipulated variable or the control input u such as:

$$\frac{d\ell(u)}{du} = \frac{d\ell_1(u)}{du} + \frac{d\ell_2(g(u))}{du} \quad (14)$$

according to some embodiments.

However, if g(u) reaches the bound c and becomes saturated (e.g., g(u)=c), g(u) is no longer a function of u:

$$\frac{d\ell(u)}{du} = \frac{d\ell_1(u)}{du} + \frac{d\ell_2(c)}{du} = \frac{d\ell_1(u)}{du} \quad (15)$$

according to some embodiments.

In this example, the gradient of the objective function is no longer a function of the second portion of the objective function $\ell_2(g(u))$ (e.g., the second power component), thereby causing the ESC optimization to ignore the effect of the fan power and merely seek to minimize compressor power, which would lead to a false solution. While simply using a barrier function should, in theory, prevent saturation from ever occurring, ESC is a dynamic optimization and phase delays between different control loops may cause saturation to occur in spite of the barrier function.

Still referring to FIG. 10, ESC controller 1002 is shown to include a communications interface 1026. Communications interface 1026 may facilitate communications between ESC controller 1002 and external applications (e.g., equipment 1006 of plant 1004, sensors 1008 of plant 1004, etc.) for allowing control and monitoring of plant 1004 or any of the components, devices, equipment, sensors, etc., of plant 1004. Communications interface 1026 may also facilitate communications between ESC controller 1002 and client devices. Communications interface 1026 may facilitate communications between ESC controller 1002 and building subsystems (e.g., building subsystems such as HVAC, lighting security, lifts, power distribution, business, etc.).

Communications interface 1026 can be or include wired or wireless communications interfaces (e.g., jacks, antennas, transmitters, receivers, transceivers, wire terminals, etc.) for conducting data communications with plant 1004 or other external systems or devices. In various embodiments, communications via communications interface 1026 can be direct (e.g., local wired or wireless communications) or via a communications network (e.g., a WAN, the Internet, a cellular network, etc.). For example, communications interface 1026 can include an Ethernet card and port for sending and receiving data via an Ethernet-based communications link or network. In another example, communications interface 1026 can include a Wi-Fi transceiver for communicating via a wireless communications network. In another example, communications interface 1026 can include cellular or mobile phone communications transceivers. In one embodiment, communications interface 1026 is a power line communications interface. In other embodiments, communications interface 1026 is an Ethernet interface.

Still referring to FIG. 10, ESC controller 1002 is shown to include a processing circuit 1010 including a processor 1012 and memory 1014. Processing circuit 1010 can be communicably connected to communications interface 1026 such that processing circuit 1010 and the various components thereof can send and receive data via communications interface 1026. Processor 1012 can be implemented as a general purpose processor, an application specific integrated circuit (ASIC), one or more field programmable gate arrays (FPGAs), a group of processing components, or other suitable electronic processing components.

Memory 1014 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1014 can be or include volatile memory or non-volatile memory. Memory 1014 can include database components, object code components, script components, or any other type of information structure for supporting the various activities and information structures described in the present application. According to some embodiments, memory 1014 is communicably connected to processor 1012 via processing circuit 1010 and includes computer code for executing (e.g., by processing circuit 1010 and/or processor 1012) one or more processes described herein.

Referring still to FIG. 10, memory 1014 includes a barrier function generator 1016, a penalty term generator 1020, an objective function generator 1018, an objective function optimizer 1022, and a control signal generator 1024, according to some embodiments. Barrier function generator 1016 is configured to generate a barrier function for an ESC optimization, according to some embodiments. In some embodiments, barrier function generator 1016 generates a barrier function b(g(u)). In some embodiments, the barrier function is a continuous function having a value that increases to infinity (or a very large number) as it approaches a boundary of a feasible region of the optimization problem. For example, the barrier function may be a logarithmic function. One example barrier function is represented by series 1104 in FIG. 11 which approaches asymptote 1110 (e.g., at saturation point 1112) which defines the transition between the non-saturated zone (e.g., the feasible region) and the saturated zone (e.g., the infeasible region).

In some embodiments, for ESC controller 1002, the control input u is a normalized parameter or variable such that $0 \leq u \leq 1$. In other embodiments, the control input u is not a normalized parameter (e.g., u may be greater than 1). Constraints can be added to the control input u to prevent, dis-incentivize, restrict, etc., ESC controller 1002 converging on a solution that lies within the saturated zone or within the infeasible region. In some embodiments, soft constraints or penalties are applied to the objective function (e.g., generated by objective function generator 1018) so that objective function optimizer 1022 may converge upon a solution in or near the saturated zone if such a solution is optimal. In some embodiments, the soft constraints or penalties only activate, affect the objective function, become non-zero, etc., when the control input or the manipulated variable u approaches or becomes equal and/or greater than the saturation point 1112, the asymptote 1110, the saturated zone, or the unfeasible region.

Barrier function generator 1016 provides the barrier function b(g(u)) to objective function generator 1018 for use in generating, providing, defining, constructing, etc., the objective function, according to some embodiments. In some embodiments, the barrier function is a logarithmic function (e.g., shown in Equation (11) above).

Referring still to FIGS. 10 and 11, memory 1014 includes a penalty term generator 1020, according to some embodiments. In some embodiments, penalty term generator 1020 is configured to generate, provide, define, etc., the penalty term to objective function generator 1018 for use in defining, generating, providing, constructing, determining, obtaining, etc., the objective function. In some embodiments, the penalty term is a soft penalty that dis-incentivizes objective function optimizer 1022 from achieving a solution in the saturated zone or the infeasible region. In some embodiments, the penalty term only activates when the solution approaches or enters the infeasible region (e.g., the saturated zone) or as any of the internal parameters, control variables, manipulated variables, performance variables, state variables, etc., become saturated.

The penalty term that is provided to objective function generator 1018 is defined in Equation (16) below:

$$p_k = (u - u_f)^2 \qquad (16)$$

where $p_k$ is the penalty term, u is the control input or the manipulated variable, and $u_f$ is a feasible value of the control input or the manipulated variable, according to some embodiments.

Referring particularly to FIG. 11, graph 1100 is shown to include a feasible point 1106 having a corresponding value $u_f$ of the manipulated variable u. As shown in FIG. 11, feasible point 1106 can be any arbitrary point on series 1102 that is in the non-saturated zone or that is a feasible operating point. In some embodiments, feasible point 1106 is a predetermined or predefined value. In some embodiments, feasible point 1106 is automatically detected by ESC controller 1002 when ESC controller 1002 detects that plant 1004 is operating normally. In some embodiments, feasible point 1106 is provided to ESC controller 1002 by a technician, a building manager, a user, etc., via a user interface (UI) or human machine interface (HMI) (e.g., a local user interface or a remote user interface).

In some embodiments, the penalty term is a difference between a current value of the manipulated variable or the control input u and the feasible point 1106 that is squared. For example, the difference $u - u_f$ of the penalty term is graphically represented by distance 1114 in graph 1100. In some embodiments, penalty term generator 1020 is configured to receive real-time values of the control input or the manipulated variable u from objective function optimizer 1022 or before the control input u is used by control signal generator 1024 to generate control signals for plant 1004 (e.g., for equipment 1006). In some embodiments, penalty term generator 1020 provides the penalty term to objective function generator 1018 and/or barrier function generator 1016.

In some embodiments, the penalty term is used (e.g., by barrier function generator 1016 and/or by objective function generator 1018) to generate, define, construct, determine, provide, etc., a modified barrier function b'(.). In some embodiments, the modified barrier function is a term of the objective function that is provided by barrier function generator 1016 and penalty term generator 1020. The modified barrier function b'(.) has the form:

$$b'(g(u), u) = b(g(u))(u - u_f)^2 \qquad (17)$$

where g(u) is a variable or parameter that is affected by the control input u, b(g(u)) is the barrier function, and $(u - u_f)^2$ is the penalty term provided by penalty term generator 1020, according to some embodiments. In some embodiments, the feasible point $u_f$ is a known feasible point in the u space. In some embodiments, u is bounded within design limits. In some embodiments, a midpoint between the boundaries of the design limits is a feasible point (e.g., $u_f = 0.5$ when $0 \leq u \leq 1$). In some embodiments, the feasible point $u_f$ can be set to any value and reset, adjusted, increased, decreased, etc., during the optimization, before the optimization, etc., by other logic, an external controller, ESC controller 1002, a user, an operator, a building manager, etc., to maintain feasibility.

In some embodiments, incorporating the penalty term with the barrier function provided by barrier function generator 1016 results in the modified barrier function being minimized by adjusting, biasing, driving, pulling, etc., the control input u back towards the feasible point $u_f$ (i.e., feasible point 1106) or in a direction towards the feasible point $u_f$. In some embodiments, biasing, pulling, etc., the control input u back towards the feasible point $u_f$ results in the control input u being drawn back into the feasible region or the non-saturated zone (e.g., out of the infeasible region or the saturated zone, or away from the transition between the feasible region and the infeasible region). In some embodiments, the penalty term is activated by the barrier function so that the penalty term is inactive, has a negligible effect, does not effect, etc., the objective function when the control input u or the adjusted variable is in the feasible region/the non-saturated zone.

In some embodiments, objective function generator 1018 is configured to provide, define, construct, generate, obtain, etc., the objective function and provide the objective function to objective function optimizer 1022. The objective function has the form:

$$\ell(u) + \mu b(g(u))(u-u_f)^2 \quad (18)$$

where $b(g(u))$ is the barrier function provided by barrier function generator 1016, $(u-u_f)^2$ is the penalty term provided by penalty term generator 1020, $\mu$ is an adjustable factor or variable or parameter that can be scaled (e.g., increased or decreased), $\ell$ is a function that relates the control input u to the performance variable y (e.g., shown in Equation (7) above). In some embodiments, the term $\mu b(g(u))(u-u_f)^2$ of the objective function shown in Equation (18) above is a saturation adjustment term that can become active as plant 1004 or the control input u approaches saturation point 1112 or asymptote 1110, or the boundary between the non-saturated zone and the saturated zone. In some embodiments, the saturation adjustment term remains active even when plant 1004 operates in the saturation zone or the infeasible region. In some embodiments, a magnitude of the saturation adjustment term (e.g., when the saturation adjustment term is active due to the boundary function $b(g(u))$), is proportional to the difference between the feasible point 1106 and the current value of the control input u or the current state of plant 1004.

In some embodiments, the magnitude of the saturation adjustment term is also affected by, determined by, proportional to, related to, etc., the adjustable factor $\mu$. In some embodiments, the effect that the adjustable factor $\mu$ has on the magnitude of the saturation adjustment term is independent of the difference $\mu - \mu_f$. In this way, the saturation adjustment term may become active to affect the objective function in Equation (18) when the control input u or the plant 1004 approaches the saturation point 1112 or the infeasible region or the saturated zone (e.g., as plant 1004 or the control input u become saturated) and may remain active even when the control input u or the plant 1004 is beyond the saturation point 1112, or in the infeasible region or saturated zone. Additionally, the magnitude of the saturation adjustment term can be at least partially affected by the distance 1114 between the current value of the control input u and the feasible point 1106, $u_f$. The magnitude of the saturation adjustment term is also at least partially affected by the value or magnitude of the adjustable factor $\mu$, according to some embodiments.

In some embodiments, the saturation adjustment term may function to draw the plant 1004 or the control input u towards the feasible point 1106, and activates when the control input u or the plant 1004 approaches (e.g., is within a certain distance from) the saturation point 1112 or the saturated zone. In some embodiments, the saturation adjustment term functions to draw the control input u or the plant 1004 out of the saturated zone or out of the infeasible region towards the feasible point 1106. In some embodiments, the magnitude of a tendency of the saturation adjustment term (e.g., the magnitude of the penalty defined by the saturation adjustment term) increases with increased distance between the current value of the control input u or the current operating state of the plant 1004 and the feasible point 1106. In this way, the feasible point 1106 may function as a centering point that draws or pulls the control input u or the plant 1004 out of the saturated zone, out of the infeasible region, etc. However, the feasible point 1106 is only used, or is only actively used in optimization of the objective function when the saturation adjustment term is activated (e.g., when the control input u is proximate the saturated zone or the infeasible region, when the plant 1004 is in or near the infeasible region, etc., defined by the barrier function $b(g(u))$). In some embodiments, the saturation adjustment term remains activated or actively affects the optimization of the objective function while the plant 1004 is in the infeasible region. Once the plant 1004 moves out of the saturated zone or the infeasible region, the saturation adjustment term may de-activate.

At or near saturation (e.g., when the control input u is substantially equal to a saturation value $u_{sat}$ of the control input u at the saturation point 1112 or within a certain distance from asymptote 1110 or saturation point 1112, or when the performance variable y is at or near the saturation point c), the unmodified barrier function $b(g(u))$ is constant (e.g., $b(g(u))=c$) but the modified barrier function $b'(.)$ is still a function of u:

$$\frac{d\ell(u)}{du} = \frac{d\ell_1(u)}{du} + \frac{d\ell_2(c)}{du} = \frac{b'(g(u), u)}{du} \quad (19)$$

which reduces to:

$$\frac{d\ell(u)}{du} = \frac{d\ell_1(u)}{du} + 0 + b(c)(2u - 2u_f) \quad (20)$$

according to some embodiments.

In some embodiments, the saturation constraint associated with the objective function provided by objective function generator 1018 is: $l \leq g(u) \leq h$. For example, there may be upper and lower bounds outside of which the control input u becomes saturated. One possible barrier function that can be used to enforce this constraint is shown in Equation (21) below:

$$b(g(u)) = \max\left(0, \frac{\epsilon}{g_n(u)} - 1\right) + \max\left(0, \frac{\epsilon}{1 - g_n(u)} - 1\right) \quad (21)$$

where:

$$g_n(u) = \min\left(\max\left(\delta, \frac{g(u) - l}{h - l}\right), 1 - \delta\right) \quad (22)$$

is a normalized version of the constraint function such that $\delta \leq g_n(u) \leq 1-\delta$, and $\in$ is a fraction of a normalized range of the constraint function that determines when the penalty (e.g., the saturation adjustment term) begins to grow in magnitude (e.g., when the saturation adjustment term activates). In some embodiments, the function b(g(u)) is substantially equal to zero when $\in \leq g_n(u) \leq 1-\in$ but rises rapidly and monotonically when $g_n(u) \leq \in$ or $g_n(u) \geq 1-\in$. In some embodiments, δ is a number (e.g., a small number) or a value that prevents division by zero at saturation. For example, δ may be a negligible or very small value that is substantially equal to zero (e.g., 0.01, 0.001, etc.).

In some embodiments, objective function generator 1018 provides the objective function (e.g., the objective function shown in Equation (18) above) to objective function optimizer 1022. Objective function optimizer 1022 can be configured to modulate the control input u or adjust the control input u to minimize the objective function. The optimization problem solved by objective function optimizer 1022 has the form:

$$\underset{u}{\text{minimize}}\ \ell(u) \tag{23}$$

$$\text{subject to: } g(u) \leq h \tag{24}$$
$$g(u) \geq l$$

which can be transformed into an unconstrained optimization problem as shown in Equation (25) below:

$$\underset{u}{\text{minimize}}\ \ell(u) = \mu b(g(u))(u - u_f)^2 \tag{25}$$

according to some embodiments.

In some embodiments, objective function optimizer 1022 is configured to minimize the objective function according to the optimization problem shown in Equation (25) above. Objective function optimizer 1022 can be configured to perform the optimization or solve the optimization problem to determine, obtain, solve, etc., values of the control input u that result in the minimization of $\ell(u) + \mu b(g(u))(u-u_f)^2$. In some embodiments, objective function optimizer 1022 is configured to provide the determined values of the control input u to control signal generator 1024 for generating control signals for equipment 1006 and/or to penalty term generator 1020 for determining the saturation adjustment term. In some embodiments, control signal generator 1024 is configured to use the values of the control input u to generate control signals for equipment 1006 of plant 1004 to operate equipment 1006 according to the control input u. In some embodiments, equipment 1006 receives the control signals and operates according to the control signals to affect an environmental condition or a variable condition or state of conditioned space 902 (e.g., to adjust a temperature of conditioned space 902, to affect a humidity of conditioned space 902, etc.). In some embodiments, equipment 1006 operates to affect the performance variable of plant 1004. In some embodiments, sensors 1008 are configured to measure, sense, detect, etc., or otherwise obtain values of the performance variable y of plant 1004.

Sensors 1008 may obtain or measure values of the performance variable y of plant 1004 and provide the values to objective function optimizer 1022. In some embodiments, objective function optimizer 1022 uses the values of the performance variable y in the optimization of the objective function as feedback from plant 1004. In some embodiments, objective function optimizer 1022 modulates values of the control input u to drive the performance variable y.

Figure 12:
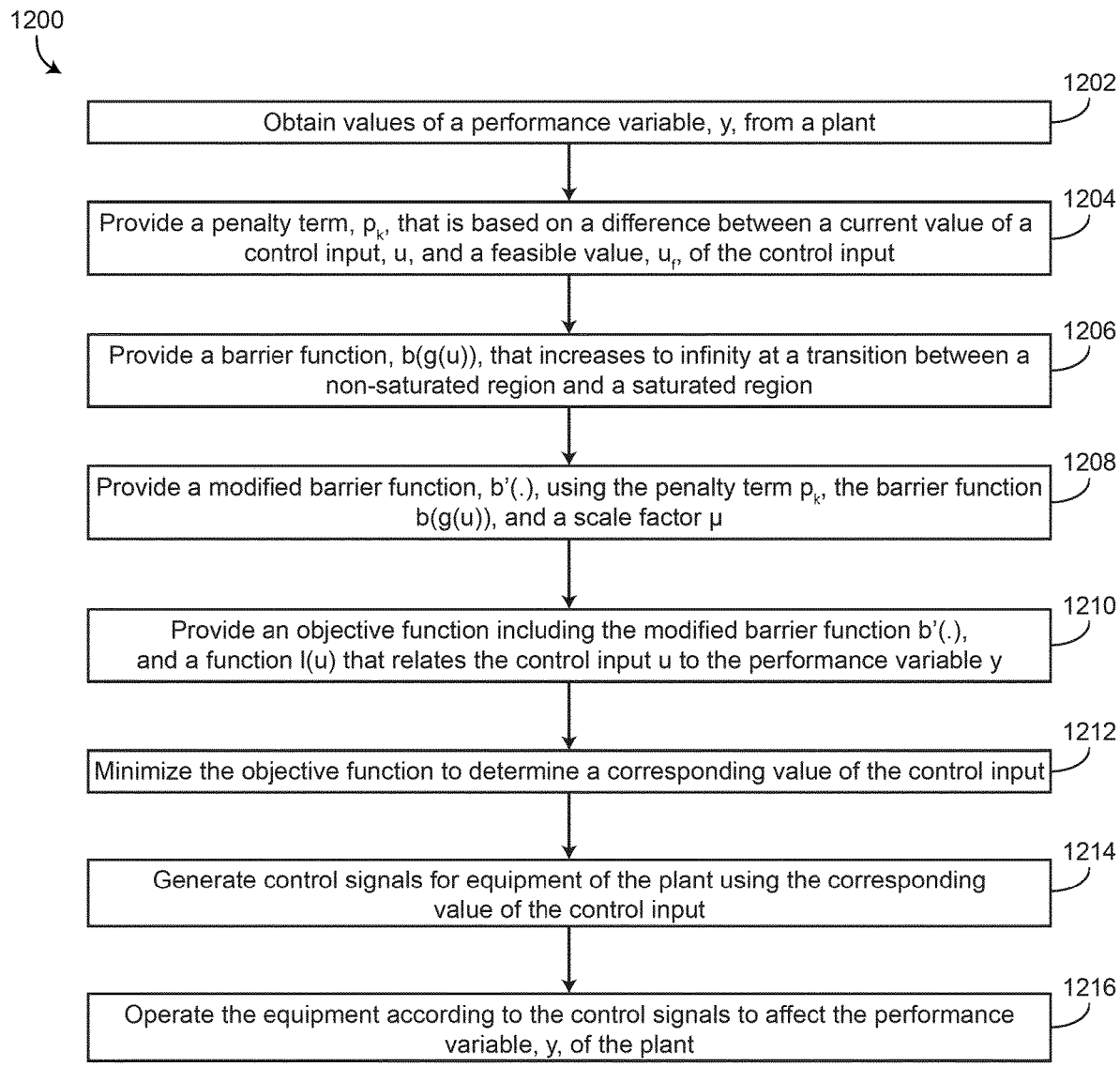
FIG. 12 is a flowchart of a process of extremum-seeking control with saturation constraints, according to an exemplary embodiment.

Referring particularly to FIG. 12, a process 1200 for performing extremum seeking control while accounting for saturation of a saturation parameter (e.g., a control input) is shown, according to some embodiments. In some embodiments, process 1200 includes steps 1202-1216. Process 1200 may be performed by ESC controller 1002 or the various components thereof. In some embodiments, process 1200 is performed to optimize or drive a gradient to an optimal point (e.g., a local minima or a local maxima) while ensuring that one or more saturation variables (e.g., the control input u) do not remain in a saturation zone or an infeasible region. In some embodiments, process 1200 is performed by ESC controller 1002 for a plant (e.g., a dynamic plant, a static plant, etc.).

Process 1200 includes obtaining values of a performance variable y from a plant (step 1202), according to some embodiments. In some embodiments, the performance variable y is a temperature, humidity, total system power, combined power of one or more compressor(s), condenser water pumps, cooling tower fans, etc. In some embodiments, the values of the performance variable y are obtained in real-time from sensors of the plant. In some embodiments, step 1202 is performed by sensors 1008 and objective function optimizer 1022. For example, objective function optimizer 1022 may obtain values of the performance variable y (or of one or more performance variables in a multi-variable optimization), as feedback for an objective function that is optimized by objective function optimizer 1022.

Process 1200 includes providing a penalty term $p_k$ that is based on a difference between a current value of a control input u and a feasible value $u_f$ of the control input (step 1204), according to some embodiments. In some embodiments, step 1204 is performed by penalty term generator 1020. In some embodiments, the penalty term is a difference between the current value of the control input u and the feasible value $u_f$ of the control input (i.e., $u-u_f$) that is squared (i.e., $p_k = (u-u_f)^2$). In some embodiments, the feasible value is a predetermined or predefined value that is within a non-saturated zone or feasible region. In some embodiments, the feasible value is provided to ESC controller 1002 by a user, a technician, etc. In some embodiments, the feasible value is obtained by ESC controller 1002 when ESC controller 1002 detects that the plant is operating normally.

Process 1200 includes providing a barrier function b(g(u)) that increases to infinity at a transition between a non-saturated region and a saturated region (step 1206), according to some embodiments. In some embodiments, step 1206 is performed by barrier function generator 1016. For example, the barrier function b(g(u)) may be used to enforce an inequality such as $g(u) \leq c$. In such an example, the barrier function b(g(u)) may be defined as $b(g(u)) = -\log(c-g(u))$, or based on another mathematical function that goes to infinity at $g(u)=c$.

Process 1200 also include providing a modified barrier function b'(.) using the penalty term $p_k$, the barrier function b(g(u)), and a scale factor μ (step 1208). In some embodiments, step 1208 is performed by the objective function generator 1018. For example, the modified barrier function b'(.) may be provided with the form:

$$b'(g(u),u) = b(g(u))(u-u_f)^2 \tag{17}$$

where g(u) is a variable or parameter that is affected by the control input u, b(g(u)) is the barrier function, and $(u-u_f)^2$ is the penalty term $p_k$, according to some embodiments.

Process 1200 also includes providing an objective function that includes the modified barrier function b'(.) and a function l(u) that relates the control input u to the performance variable y (step 1210). In some embodiments, step 1210 is performed by the objective function generator 1018. For example, the objective function may be provided with the form:

$$\ell(u)+(u)+\mu b(g(u))(u-_f)^2 \tag{18}$$

where $\ell$ is a function that relates the control input u to the performance variable y (e.g., shown in Equation (7) above).

Process 1200 also includes minimizing the objective function to determine a corresponding value of the control input (step 1212). In some embodiments, step 1212 is performed by the objective function optimizer 1022. In some embodiments, step 1212 includes solving a minimization problem to calculate the corresponding value of the control input 1212. In some embodiments, step 1212 includes calculating a gradient of the objective function and moving in a direction of negative gradient (e.g., towards a minimum of the objective function). Various processes for generating control outputs using an objective function in an extremum-seeking-control approach are described above.

Process 1200 is also shown to include generating control signals for equipment of the plant using the corresponding value of the control input (step 1214). In some embodiments, step 1214 is performed by the control signal generator 1024. For example, step 1214 may include transforming the corresponding value of the control input calculated at step 1214 into a type of digital or analog data communicable to the equipment 1006 (e.g., that can be received by the equipment 1006).

Process 1200 is also shown to include operating the equipment according to the control signals to affect the performance variable y of the plant (step 1216). In some embodiments, the control signal is provided from the control signal generator 1024 to the equipment 1006 via the communications interface 1026 to perform step 1216. The equipment 1006 is thereby controlled to affect a condition of the conditioned space 1102, for example to affect a temperature in the conditioned space 1102 by providing thermal energy to the conditioned space 1102.

Referring now to FIG. 13, a table showing a variety of example implementations are shown for the ESC with constraint handling systems and methods described herein. In particular, FIG. 13 provides examples of the manipulated variable or control input u and performance variable y that can be used in various implementations and for different types of equipment 1006.

As shown in FIG. 13, in some embodiments the equipment 1006 may include a chilled water plant. When the equipment 1006 includes a chilled water plant, in some embodiments the manipulated variable u can be the condenser water temperature setpoint and the performance variable y may be the combined power of chiller compressor(s), condenser water pumps, and cooling tower fans. Accordingly, the systems and methods described above can be configured to provide values of the condenser water temperature setpoint while accounting for the possibility of saturation in the power of any of the chiller compressor(s), condenser water pumps, and cooling tower fans or in some other variable.

In some other embodiments where the equipment 1006 includes a chilled water plant, the manipulated variables u can include the cooling tower fan speed and condenser water pump speed, while the performance variable y may be the combined power of chiller compressor(s), condenser water pumps, and cooling tower fans. Accordingly, the systems and methods described above can be configured to provide values of the cooling tower fan speed and condenser water pump speed while accounting for the possibility of saturation in the power of any of the chiller compressor(s), condenser water pumps, and cooling tower fans in some other variable.

As shown in FIG. 13, in some embodiments the equipment 1006 may include a variable refrigerant flow system. When the equipment 1006 includes a variable refrigerant flow system, in some embodiments the manipulated variable u can be a compressor suction or discharge pressure setpoint while the performance variable y can be total system power. Accordingly, the systems and methods described above can be configured to provide values of the compressor suction or discharge pressure setpoint while accounting for the possibility of saturation in the total system power in some other variable.

In some other embodiments where the equipment 1006 includes a variable refrigerant flow system, the manipulated variables u can include a compressor suction or discharge pressure setpoint and a superheat setpoint for indoor units in cooling mode. In such embodiments, the performance variable y can be total system power. Accordingly, the systems and methods described above can be configured to provide values of the compressor suction or discharge pressure setpoint and a superheat setpoint for indoor units while accounting for the possibility of saturation in the total system power in some other variable.

As shown in FIG. 13, in some embodiments the equipment 1006 includes a general vapor compression air-conditioning system, for example a rooftop unit. In some such embodiments, the manipulated variable u can include a setpoint temperature of air leaving the evaporator, while the performance variable y can be total system power. Accordingly, the systems and methods described above can be configured to provide values of the setpoint temperature of air leaving the evaporated while accounting for the possibility of saturation of the total system power in some other variable. In other embodiments where the equipment 1006 includes a general vapor compression air-conditioning system, the manipulated variable u can be an evaporator fan speed while the performance variable y is total system power. Accordingly, the systems and methods described above can be configured to provide values of the evaporator fan speed while accounting for the possibility of saturation in the total system power in some other variable. In yet other embodiments where the equipment 1006 includes a general vapor compression air-conditioning system, the manipulated variables u can include both the setpoint temperature of air leaving the evaporator and the condenser fan speed, while the performance variable y is total system power. Accordingly, the systems and methods described above can be configured to provide values for both the setpoint temperature of air leaving the evaporator and the condenser fan speed, while accounting for the possibility of saturation in the total system power in some other variable.

Table 1300 of FIG. 13 thereby provides various examples of the variables that can be used by the systems and methods described above to control various types of equipment. It should be understood that the examples of table 1300 of FIG. 13 are provided for example purposes. Other implementations of the systems and methods described herein are possible, for example having different manipulated variables and performance variables.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An extremum-seeking controller comprising a processing circuit configured to:
    modulate a manipulated variable provided as an input to a plant using an extremum- seeking control technique to drive a gradient of an objective function with respect to the manipulated variable toward an extremum;
    wherein the objective function comprises:
        a performance variable characterizing a performance of the plant responsive to the manipulated variable; and
        a saturation adjustment term that becomes active as the plant approaches a saturation point and remains active as the plant operates within a saturated region past the saturation point, the saturation adjustment term causing the processing circuit to adjust the manipulated variable toward a value of the manipulated variable that returns the plant from the saturated region to a non-saturated region, wherein the performance variable remains substantially constant responsive to changes in the manipulated variable when the plant operates within the saturated region.

2. The controller of claim 1, wherein the saturation adjustment term is based on both:
    a value of a saturation variable affected by the manipulated variable and capable of becoming saturated at a subset of values of the manipulated variable; and
    a value of the manipulated variable at which the gradient is calculated relative to the value of the manipulated variable that returns the plant from the saturated region to the non-saturated region.

3. The controller of claim 1, wherein the saturation adjustment term comprises a barrier function that has a value of substantially zero when the plant operates within the non-saturated region and increases as the plant approaches the saturated region.

4. The controller of claim 1, wherein the gradient of the objective function with respect to the manipulated variable comprises:
    a first gradient of the performance variable with respect to the manipulated variable; and
    a second gradient of a saturation variable with respect to the manipulated variable, the second gradient being substantially zero when the saturation variable is saturated.

5. The controller of claim 1, wherein the gradient of the objective function with respect to the manipulated variable comprises a difference between (1) a value of the manipulated variable at which the gradient is calculated and (2) the value of the manipulated variable that returns the plant to the non-saturated region.

6. The controller of claim 1, wherein the manipulated variable comprises a fan speed and the performance variable comprises a system power.

7. The controller of claim 1, wherein the manipulated variable comprises a compressor suction or discharge pressure setpoint.

8. An extremum-seeking controller comprising a processing circuit configured to:
    modulate a manipulated variable provided as an input to a plant using an extremum- seeking control technique to drive a gradient of an objective function with respect to the manipulated variable toward an extremum;
    wherein the objective function comprises a performance variable characterizing a performance of the plant responsive to the manipulated variable and a saturation adjustment term based on both:
        a value of a saturation variable capable of becoming saturated at a subset of values of the manipulated variable, wherein the performance variable remains substantially constant responsive to changes in the manipulated variable when the saturation variable becomes saturated; and
        a value of the manipulated variable at which the gradient is calculated relative to a value of the manipulated variable at which the saturation variable is non-saturated.

9. The controller of claim 8, wherein the saturation adjustment term comprises a barrier function that has a value of substantially zero when the saturation variable is non-saturated and increases as the saturation variable becomes saturated.

10. The controller of claim 8, wherein the saturation adjustment term causes the processing circuit to adjust the manipulated variable toward the value of the manipulated variable at which the saturation variable is non-saturated.

11. The controller of claim 8, wherein the gradient of the objective function with respect to the manipulated variable comprises:
   a first gradient of the performance variable with respect to the manipulated variable; and
   a second gradient of the saturation variable with respect to the manipulated variable, the second gradient being substantially zero when the saturation variable is saturated.

12. The controller of claim 8, wherein the gradient of the objective function with respect to the manipulated variable comprises a difference between the value of the manipulated variable at which the gradient is calculated and the value of the manipulated variable at which the saturation variable is non-saturated.

13. The controller of claim 8, wherein the manipulated variable comprises a fan speed and the performance variable comprises a system power.

14. A real-time optimization controller comprising a processing circuit configured to:
   provide a value of manipulated variable as an input to a plant;
   obtain (1) a value of a performance variable characterizing a performance of the plant responsive to the manipulated variable and (2) a value of a saturation variable affected by the manipulated variable and capable of becoming saturated at a subset of values of the manipulated variable, wherein the performance variable remains substantially constant responsive to changes in the manipulated variable when the saturation variable becomes saturated;
   evaluate an objective function comprising a performance variable term and a saturation adjustment term, the performance variable term comprising the performance variable, and the saturation adjustment term comprising (1) a function of the saturation variable and (2) a function of the value of manipulated variable provided as the input to the plant relative to a value of the manipulated variable at which the saturation variable is non-saturated; and
   adjust the value of the manipulated variable provided as the input to the plant using a real-time optimization technique to drive a gradient of the objective function with respect to the manipulated variable toward an extremum.

15. The controller of claim 14, wherein the real-time optimization technique is an extremum-seeking control technique.

16. The controller of claim 14, wherein the function of the saturation variable comprises a barrier function that has a value of substantially zero when the saturation variable is within a predefined range and increases based on an amount the saturation variable deviates from the predefined range.

17. The controller of claim 14, wherein the function of the manipulated variable causes the processing circuit to adjust the manipulated variable toward the value of the manipulated variable at which the saturation variable is non-saturated.

18. The controller of claim 14, wherein the gradient of the objective function with respect to the manipulated variable comprises:
   a first gradient of the performance variable with respect to the manipulated variable; and
   a second gradient of the saturation variable with respect to the manipulated variable, the second gradient being substantially zero when the saturation variable is saturated.

19. The controller of claim 14, wherein the gradient of the objective function with respect to the manipulated variable comprises a difference between the value of the manipulated variable provided as the input to the plant and the value of the manipulated variable at which the saturation variable is non-saturated.

20. The controller of claim 14, wherein the manipulated variable comprises a fan speed and the performance variable comprises a system power.

\* \* \* \* \*